(12) United States Patent
Pelto et al.

(10) Patent No.: US 6,200,119 B1
(45) Date of Patent: Mar. 13, 2001

(54) EXTRUSION CALIBRATOR WITH MODULAR CALIBRATING CASSETTE

(75) Inventors: Walter Pelto, Champlin; Donald Zoubek, Andover; Kevin Bartness, Big Lake, all of MN (US)

(73) Assignee: Automated EDM Inc., Ramsey, MN (US)

( * ) Notice: Subject to any disclaimer, the term of this patent is extended or adjusted under 35 U.S.C. 154(b) by 0 days.

(21) Appl. No.: 09/156,428

(22) Filed: Sep. 18, 1998

(51) Int. Cl.$^7$ .................................................. B29C 59/06
(52) U.S. Cl. ............................ 425/71; 425/384; 425/388
(58) Field of Search ........................... 425/71, 392, 388, 425/384; 264/209.4, 209.5

(56) References Cited

U.S. PATENT DOCUMENTS

| | | | |
|---|---|---|---|
| 4,468,369 | 8/1984 | Gauchel et al. | 264/560 |
| 4,655,704 | * 4/1987 | Dekel | 425/461 |
| 5,288,218 | 2/1994 | Melkonian | 425/71 |
| 5,316,459 | * 5/1994 | Melkonian et al. | 425/71 |
| 5,342,187 | * 8/1994 | Ohanesian | 425/70 |
| 5,464,335 | * 11/1995 | Bessemer et al. | 425/71 |
| 5,514,325 | * 5/1996 | Purstinger | 264/560 |
| 5,516,270 | 5/1996 | Lehtinen | 425/71 |
| 5,589,131 | * 12/1996 | Steketee, Jr. | 264/568 |
| 5,648,102 | * 7/1997 | Czarnik | 425/71 |
| 5,943,756 | * 8/1999 | Racioppi et al. | 29/466 |

* cited by examiner

Primary Examiner—Harold Pyon
Assistant Examiner—Joseph S. Del Sole
(74) Attorney, Agent, or Firm—Malcolm D. Reid; Cecilia M. Jaisle

(57) ABSTRACT

An extrusion calibrator, to calibrate the exterior profile of a thermoplastic extruded product exiting from an extrusion die, has a modular calibrating cassette of calibrating plates in a surrounding shell. One calibrating cassette is readily interchangeable within the shell for another calibrating cassette of a different extruded product cross-sectional profile. The cassette plates have planar surfaces, free of fluid-conducting pathways, which greatly reduces the time, cost and skill required to establish vacuum and coolant conducting routes through the extrusion calibrator. Fluid conducting routes to conduct vacuum and coolant through the calibrator are established by vacuum and coolant conducting manifolds and channels in the shell interior and by interplate spacings mating with these channels.

18 Claims, 6 Drawing Sheets

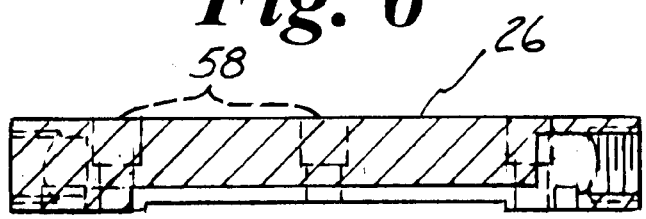
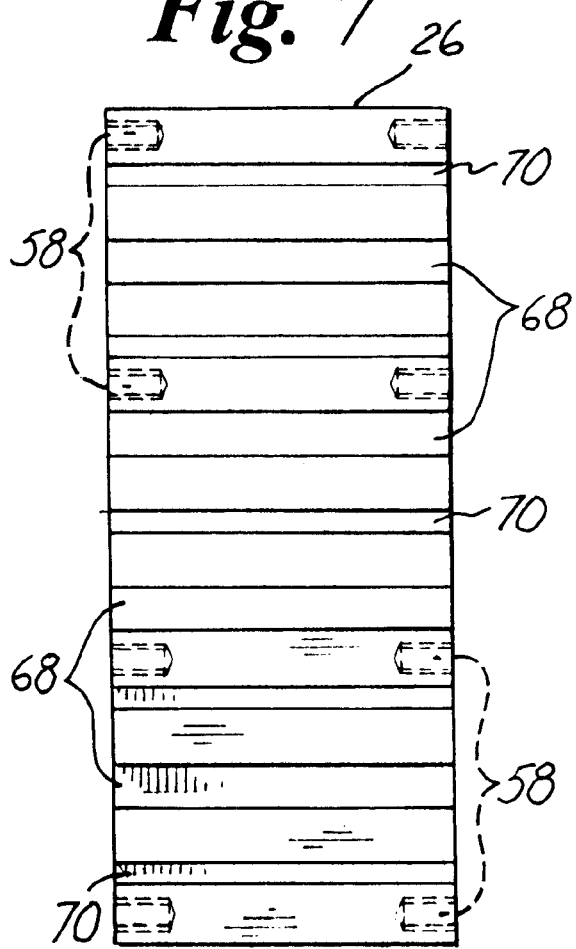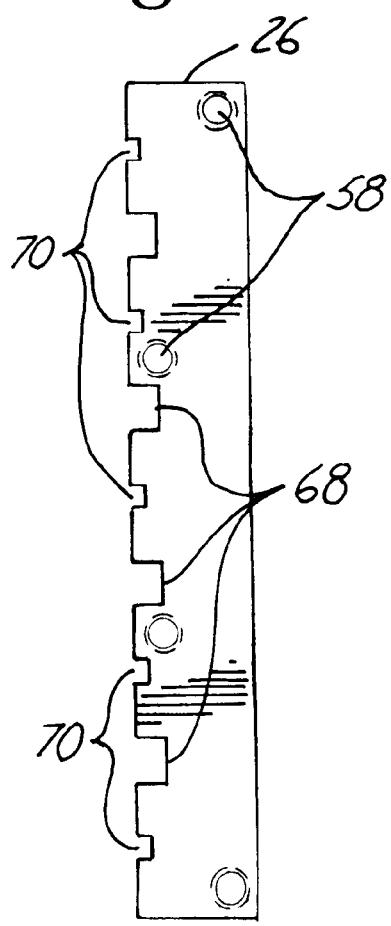

EXTRUSION CALIBRATOR WITH MODULAR CALIBRATING CASSETTE

FIELD OF THE INVENTION

The present invention generally relates to extrusion calibrators, and more specifically, relates to an extrusion calibrator to calibrate the exterior profile of a thermoplastic extruded product exiting from an extrusion die. In particular, this invention relates to an extrusion calibrator having a modular calibrating cassette of wear-resistant plates retained in a surrounding shell, so that one calibrating cassette is readily interchangeable with another calibrating cassette of a different extruded product cross-sectional profile. In this inventive extrusion calibrator, the fluid conducting routes for conducting vacuum and coolant through the extrusion calibrator are established by vacuum and coolant conducting manifolds and channels within the shell interior and by interplate spacings mating with these channels. The plates of the cassette have planar surfaces, free of fluid-conducting pathways, which greatly reduces the time, cost and skill required in establishing the required vacuum and coolant conducting routes through the extrusion calibrator.

BACKGROUND OF THE INVENTION

In the process of continuously melt-extruding thermoplastic material from an extrusion die, the extruded product exits the die at an elevated temperature and in a relatively soft state, unable to retain the shape imparted by the die. To assure that the final extruded product has the required exterior shape and dimensions, the exterior cross-sectional profile of the extruded product is cooled and calibrated by passing the extruded product through an extrusion calibrator. The extrusion system, thus, includes both the extrusion die and one or more extrusion calibrators. In each extrusion calibrator, the extruded product is cooled as it travels through a passageway generally similar in size and shape to that of the extrusion die. Each extrusion calibrator has ports and channels for the entry and circulation of a coolant medium (generally water) and vacuum ports for withdrawal of steam generated by cooling of the extruded product. As the extruded product travels through the extrusion calibrator passageway, a thin layer of water covers the extruded product outer surface. The water layer tends to cool the outer surface of the extruded product, producing a thin surface "skin" to further hold the product shape. The water layer also tends to lubricate the extruded product as it passes through the extrusion calibrator. The extrusion calibrator passageway may typically have a smaller cross-sectional size than the extrusion die passageway, further to shape the extruded product, which tends to contract as it cools. The extrusion calibrator passageway may also gradually reduce in cross-sectional size along the passageway, again to accommodate contraction of the extruded product on cooling. The amount of taper and the angle of taper will be determined based on the expected shrinkage of the specific plastic used for the extruded product.

Besides removing steam generated by the cooling extruded product, the vacuum holds the walls of the hollow or single wall extruded product in place against the interior walls of the passageway as the extruded product travels through the extrusion calibrator, further helping the cooling extruded product to retain its desired shape. The vaporization of water contacting the extruded product traveling through the extrusion calibrator removes a large amount of heat (BTUs) from the extruded product, and the steam is extracted through the vacuum exhaust ports. Such evaporation systems can remove heat from the extruded product at a much higher rate than possible with conventional heat transfer type extrusion calibrators. Because of the time required to cool the extruded product and the speed of extruded product travel required for economical production, a series of extrusion calibrators may be used to cool and shape the extruded product in an acceptable amount of time and at an acceptable throughput speed. Pullers positioned after the last extrusion calibrator control the extrusion speed by continuously drawing the formed extruded product exiting from the last extrusion calibrator. Examples of extrusion calibration systems are shown, for example, in U.S. Pat. Nos. 5,516,270, 5,514,325, 5,316,459, 5,288,218 and 4,468,369. Extruded products made by such processes typically have a uniform hollow cross-sectional shape along their longitudinal axis, including products such as automobile moldings, window parts, and pipe.

Automated EDM, Inc., the assignee of this application, has previously made available an extrusion calibrator, that was assembled from a series of thicker plates of a harder metal, such as steel, alternating with a series of thinner plates of a softer metal, such as aluminum. The thicker plates were each constructed with an aperture sized and shaped to a cross-sectional profile of an extruded product exiting from an extrusion die. The thinner plates were also each constructed with an aperture matched to that of the thicker plates. The thinner plates also were constructed with channels for introduction and circulation of coolant and vacuum. The thinner and thicker plates were assembled in alternation and retained by threaded rods inserted through the assembled plates. The apertures together defined the extrusion passageway and were shaped using wire electrical discharge machining (WEDM) to construct the passageway through the assembled plates. The vacuum and coolant channels were formed by using computer numerically controlled (CNC) milling technology. Holes for the threaded rods were drilled and reamed. With the plates assembled, the channels on the thinner plates provided pathways for coolant and vacuum circulation from sources exterior to the calibrator to the passageway to contact, cool and extract heat from the traveling extruded product. To provide an extrusion calibrator for an extruded product of a different cross-sectional profile requires the manufacture of an entirely new calibrator. Changing a calibrator of one passageway cross-sectional profile to one of a different profile requires disassembling and reassembling all vacuum and coolant access lines. If more than one extrusion calibrator of this earlier design is used in series, such as attached to a baseplate, all of the calibrators must be removed from the baseplate in order to change the passageway profile of the series of calibrators.

SUMMARY OF THE INVENTION

The present invention is an extrusion calibrator to calibrate an exterior profile of a thermoplastic extruded product exiting from an extrusion die. An extrusion calibrator of this invention may include a pair of covers, a pair of sidewalls, and a set of wear-resistant plates. Each cover has a vacuum manifold and a coolant manifold formed on a cover surface. The manifolds have at least one vacuum channel and at least one coolant channel, respectively. Each side wall has at least one vacuum channel and at least one coolant channel, respectively, in communication with the vacuum manifold and the coolant manifold, respectively, in each cover. The vacuum channels communicate between the vacuum manifold and a vacuum source and vacuum outlet, respectively, and the coolant channels communicate between the coolant manifold and a coolant source and coolant outlet, respectively. The vacuum and coolant channels may be in parallel arrangement alternating with each other. The vacuum manifold and channels may be of larger cross-section than the coolant manifold and channels. A liquid ring vacuum pump removes moisture from the atmosphere within the calibrator.

Each plate has a calibrating aperture dimensioned to an extruded product cross-section exterior. The plates have planar surfaces free of fluid conducting pathways. The plates are oriented to each other, so that the apertures together define an extrusion passageway through the calibrator. The cross-sectional dimensions of the passageway may decrease in the direction of travel of the extruded product through the calibrator, to accommodate shrinkage of the extruded product with cooling and to insure accurate dimensioning and profiling of the extruded product. The plates may be spaced to each other and to the respective manifold and channel, so that one inter-plate spacing (or set of spacings) communicates between the vacuum manifold, vacuum channels and the passageway, while another inter-plate spacing (or set of spacings) communicates between the coolant manifold, coolant channels and the passageway. The oriented plates are retained together into a cassette, for example, by threaded rods inserted through the oriented plates. The pins are generally aligned with the passageway, and the inter-plate spacing may be maintained by precision spacers on the pins. The first and last inter-plate spacings of the cassette may communicate with the coolant route and the other inter-plate spacings may alternately communicate with the vacuum route and the coolant route, respectively. Typically, a route for coolant is positioned as the first spacing, so that a coolant layer will cool the outer surface of the extruded product, producing a thin surface "skin" to further hold the product shape. Also, the coolant layer will lubricate the extruded product as it passes through the extrusion calibrator. The first and last coolant inter-plate spacings may be smaller than the other coolant inter-plate spacings, and the vacuum inter-plate spacings may generally be about equal to the first and last coolant inter-plate spacings. The covers and sidewalls may be assembled to the cassette of oriented plates, so that the covers and sidewalls together form an open-ended shell, with the open ends oriented longitudinally with the passageway. The channeled cover surfaces may each have a recess matched to the width of the cassette, to further locate and retain the covers to the cassette and correctly to position the cover and sidewall channels to the inter-plate spacings. The cover is retained, for example, by threaded screws through clearance holes in the cover and into corresponding threaded holes in the ends of the sidewalls and the plates. The threaded screws and the pins may be counterbored. The threaded holes in the side walls may be symmetrical, so that the sidewalls are reversible about a horizontal centerline in assembly of the extrusion calibrator.

An extrusion calibrator according to this invention may comprise an open-ended exterior shell and a cassette of wear-resistant calibrating plates. The shell has a vacuum route and a coolant route formed on the shell interior surface, the routes communicate between a vacuum source and outlet, and between a coolant source and outlet, respectively. The cassette plates together define an extrusion passageway between the shell open ends. The passageway is dimensioned to the extruded product cross-section exterior profile. The plates may be spaced to each other and to the respective route, so that a first inter-plate spacing (or set of spacings) communicates between the vacuum route and the passageway, while another inter-plate spacing (or set of spacings) communicates between the coolant route and the passageway.

Generally, an extrusion calibrator of this invention, which uses a cassette having a single passageway is suitable for calibrating a generally hollow extruded product. An alternative embodiment of a cassette may be used to calibrate a hollow extruded product that has a nonhollow segment, such as an exterior flange. To calibrate such an extruded product, the cassette may comprise mating upper and lower cassette portions, each formed of upper and lower plate portions. The upper and lower plate portions, respectively, may be spaced and retained into the upper and lower cassette portions, respectively, by means of threaded rods through holes, in the same manner as for the unitary cassette. The mating sides of each cassette portion each are shaped with a part, generally about half, of the cross-sectional shape of the passageway. Constructing the cassette in this manner allows for easier shaping of the passageway to accommodate the non-hollow segment of the extruded product to be calibrated.

Accommodating the extrusion calibrator to an alternate extruded product cross-section exterior profile involves removing the shell from a first cassette and installing the shell about a second cassette having an extrusion passageway dimensioned to the alternate extruded product cross-section exterior profile, while the shell remains connected to vacuum and coolant sources and outlets, respectively. When the shell is comprised of a pair of covers and a pair of sidewalls, exchanging the cassette involves removing the covers (and optionally the sidewalls) from one cassette and installing the covers and sidewalls to a second cassette, while the vacuum and coolant sources and outlets remain connected to the covers, respectively.

Also, according to this invention, two or more calibrators may be attached in series to a single base plate, so that their passageways are generally axially aligned to each other. The base plate may be retained to the calibrator cover by means of counter-bored shoulder bolts. To position the shoulder bolts, a few threaded screws are removed from the lower cover and the shoulder bolts pass through holes in the base plate and in the lower cover to screw into threaded holes in the plates and/or the sidewalls.

An extrusion calibrator may be made by the following method. A pair of covers are constructed, so that each cover has a vacuum manifold and a coolant manifold formed on a cover surface. Each manifold is constructed with at least one vacuum channel and at least one coolant channel, respectively. The vacuum manifold connects between a vacuum source and outlet, and the coolant manifold connects between a coolant source and outlet. A pair of sidewalls are constructed, so that each side wall has a vacuum channel and a coolant channel, respectively, in communication with the vacuum manifold and the coolant manifold, respectively. A set of wear-resistant plates are constructed, so that each plate has a calibrating aperture dimensioned to an extruded product cross-section exterior. The plates are oriented to each other in a cassette, so that the apertures together define an extrusion passageway through the calibrator, and so that the plates are spaced to each other and to the respective channels. The sidewalls and covers are assembled to the oriented plates, so that the sidewalls and covers form an open-ended shell retaining the oriented plates. The passageway is longitudinally aligned with the open ends. At least one inter-plate spacing (or set of inter-plate spacings) between adjacent plates is in fluid-tight communication solely between the vacuum manifold, vacuum channels and the passageway, while at least one other inter-plate spacing (or set of inter-plate spacings) between adjacent plates is in fluid-tight communication solely between the coolant manifold, coolant channels and the passageway. The plates may be oriented to each other by inserting threaded rod through the plates. The rods are generally aligned with the passageway. The plates may be spaced to each other and to the respective manifold channel by spacers maintained on the rods between adjacent plates. The covers may be constructed to remain connected to vacuum and coolant sources and outlets, respectively, during exchange of a first cassette for a second cassette having an extrusion passageway of a different cross-sectional profile.

BRIEF DESCRIPTION OF THE DRAWINGS

FIG. 6 is a cross-sectional view of the cover of FIG. 4, taken along the line 6—6 in FIG. 5.

FIG. 7 is a plan view of a sidewall of the extrusion calibrator of FIG. 1, showing the coolant and vacuum channels, with the threaded screw holes seen in phantom.

FIG. 8 is an end view of the sidewall of FIG. 7, showing the coolant and vacuum channels, with the threaded screw holes.

DESCRIPTION OF THE INVENTION

Figure 1:
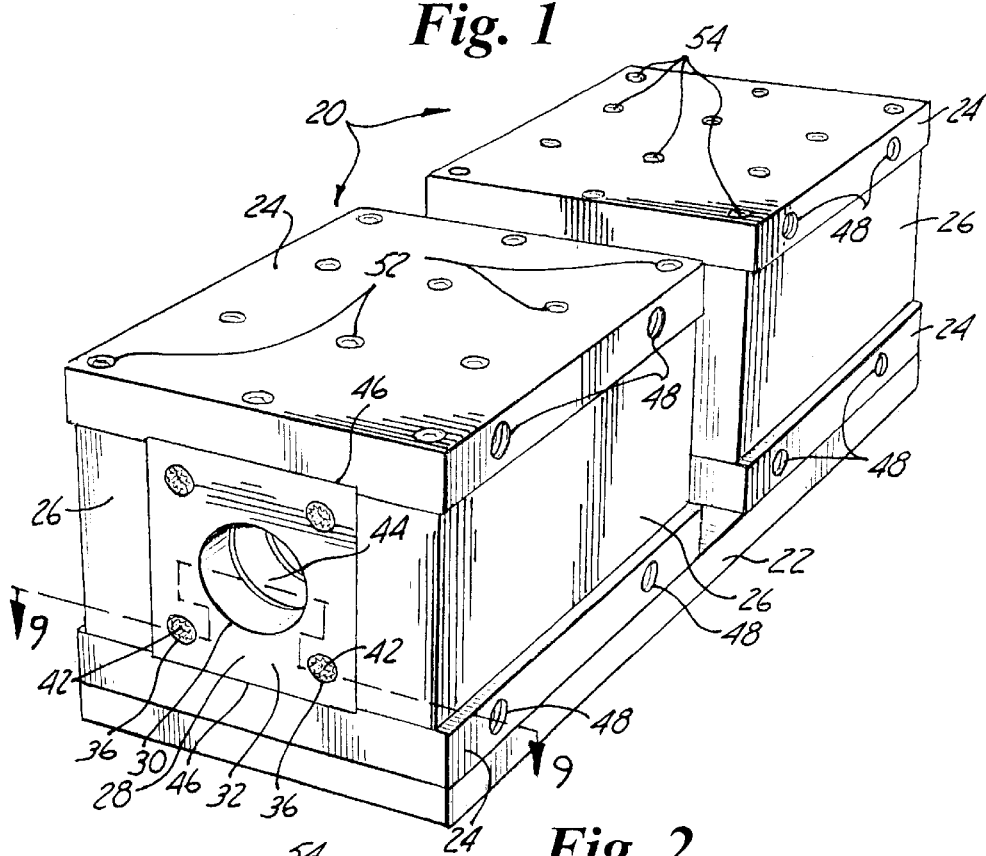
FIG. 1 is a front perspective view of a matched set of extrusion calibrators of this invention arranged in series and fastened to a baseplate.
Figure 2:
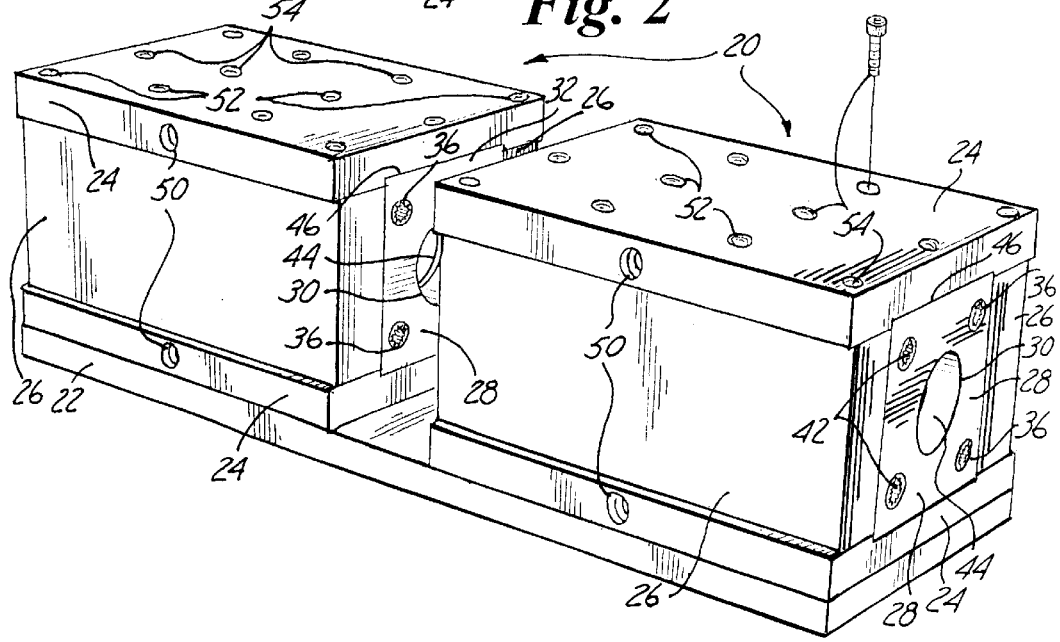
FIG. 2 is a side perspective view of the set of extrusion calibrators shown in FIG. 1.

A first embodiment of an extrusion calibrator 20 of this invention will now be described with reference to FIGS. 1 through 10. FIG. 1 shows a pair of extrusion calibrators 20 arranged in series and fastened to a baseplate 22. Each extrusion calibrator 20 includes a pair of upper and lower covers 24, a pair of right and left sidewalls 26 and a set of wear-resistant calibrating plates 28. Each calibrating plate has an aperture 30, which is sized and shaped to the external cross-sectional profile of an extruded product (not shown) to be cooled and calibrated through the extrusion calibrator 20. The calibrating plates 28 are oriented to each other and retained in a cassette 32 by precision ground rods 34 with threaded ends inserted into aligned holes 36. The required inter-plate spacings 38 between the plates 28 are sized and retained by spacing washers 40 aligned on the rods 34. The rods 34 retain the plates 28 and washers 40 in alignment by means of internally threaded ends 42, which may be counterbored into the outer faces of the first and last plate 28 of each cassette 32. The orientation and alignment of the plates 28 into the cassette 32 can perhaps best be seen with reference to FIG. 3. The apertures 30 of the individual plates 28, when assembled into the cassette 32, form an extrusion passageway 44 through which the extruded product exiting from the extrusion die (both not shown) will travel. The passageway 44 is visible through the first plate 28 of the cassette 32 of the first calibrator 20 in FIG. 1, and through the first plates 28 of the cassettes 32 of the first and second calibrators 20 in FIG. 2. Once the cassette 32 has been assembled, the upper and lower covers 24 are positioned to the cassette 32. Note that the length of the covers 24 is equal to the length of the assembled cassette 32. Each cover 24 has a longitudinal recess 46 sized and shaped to retain and locate the top (bottom) of the cassette 32. One side edge of each cover 24 is drilled with a pair of access ports 48 and the opposite cover 24 edge is drilled with a single access port 50. In the embodiment shown in FIGS. 1–10, the pair of access ports 48 provide access for vacuum exhaust, while the single access ports 50 provide access for coolant inlet, as will be later described in greater detail. With the covers 24 thus positioned, the sidewalls 26, which are equal in length to the cassette 32 and to the covers 24, are slid into place. The covers 24 are retained to the cassette 32 and to the sidewalls 26 by clearance and counterbored holes 52 through each cover 24 and corresponding threaded holes in edges of the plates 28 and the sidewalls 26. Threaded screws 54 through the holes 52 may be counterbored to the level of the cover 24. The two extrusion calibrators 20 are positioned and retained to the baseplate 22 by threaded shoulder bolts through precision holes in the baseplate 22 and the lower cover 24. To secure the baseplate 22 to the lower cover 24, a few threaded screws 54 are removed from holes 52 in the lower cover 24, and threaded shoulder bolts are inserted through the holes in the baseplate 22 and lower cover 24 and are screwed into threaded holes in edges of the plates 28 and/or sidewalls 26. The shoulder bolts are not visible in FIG. 3, but are attached in the same manner as will be later herein shown and described with reference to FIG. 11. The shoulder bolts may be counterbored in the baseplate 22 holes.

Figure 3:
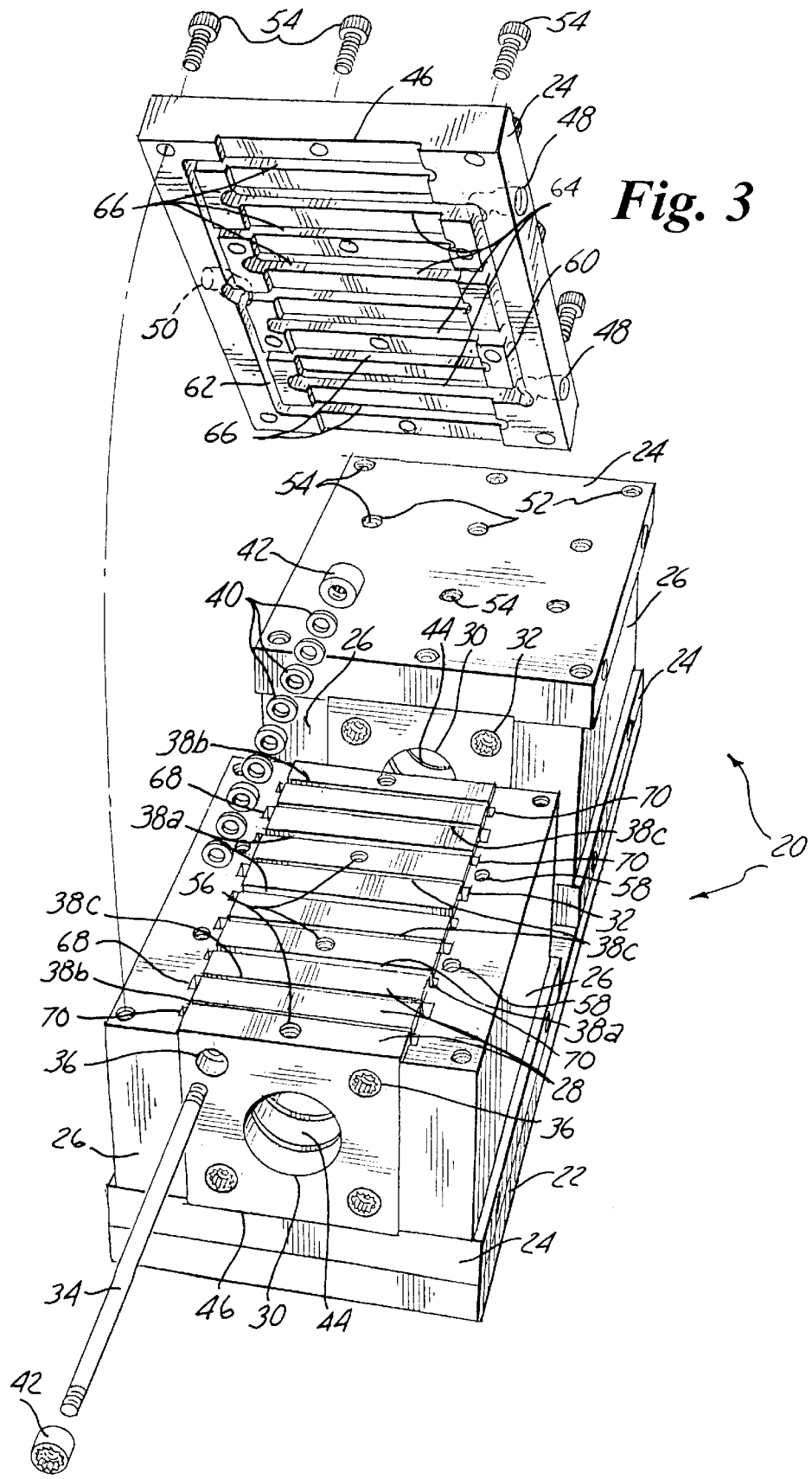
FIG. 3 is front perspective view of the set of extrusion calibrators shown in FIG. 1, showing a threaded alignment rod and inter-plate spacing washers removed from the threaded holes through the cassette of wear-resistant plates and showing the cover plate and threaded screws removed from the cassette and the sidewalls, with the vacuum and coolant manifolds and channels on the inside cover surface.
Figure 4:
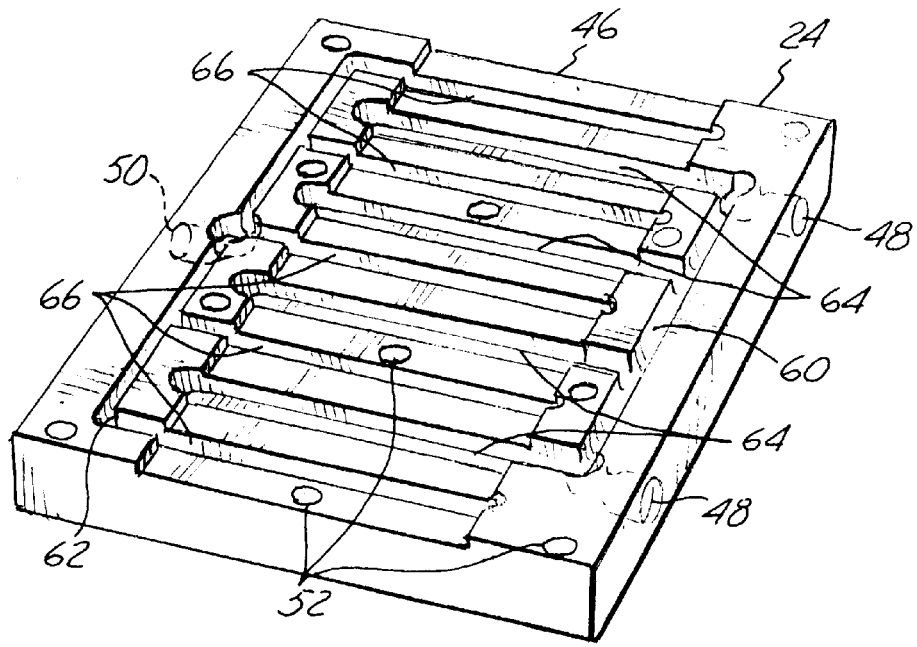
FIG. 4 is perspective view of a cover of the extrusion calibrator of FIG. 1, showing the vacuum and coolant manifolds and channels.
Figure 5:
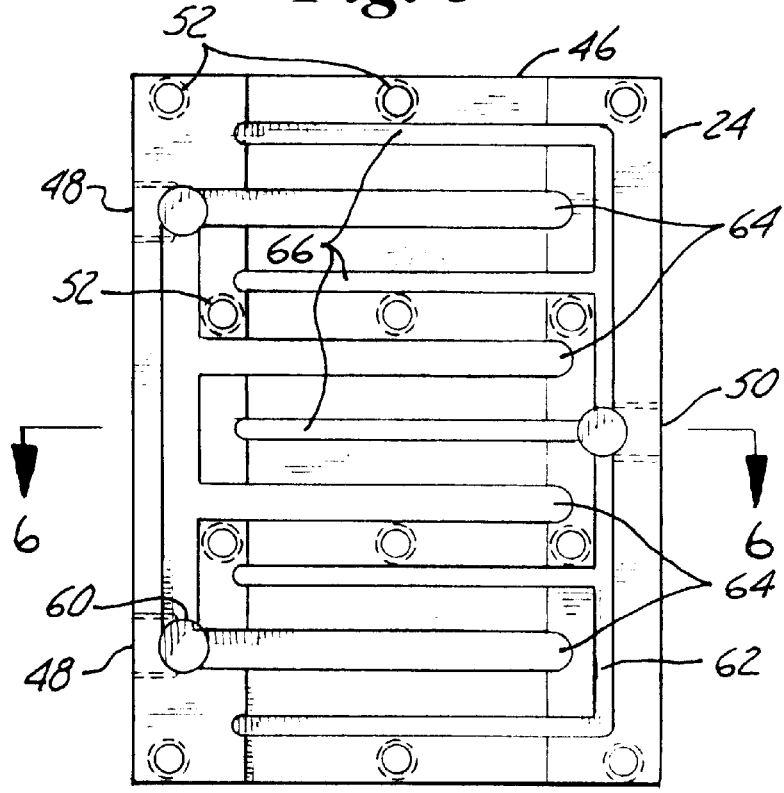
FIG. 5 is a plan view of the cover of FIG. 4.
Figure 9:
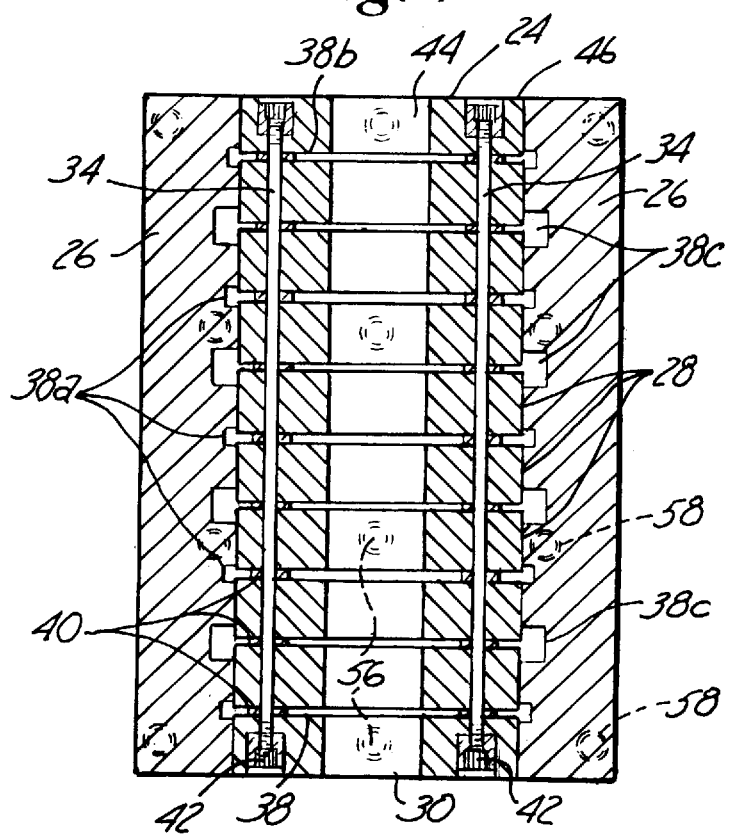
FIG. 9 is a top view of a cassette of calibrator plates with associated sidewalls, taken along the line 9—9 of FIG. 1, showing the alignment of the inter-plate spacings with the sidewall vacuum and coolant channels.
Figure 10:
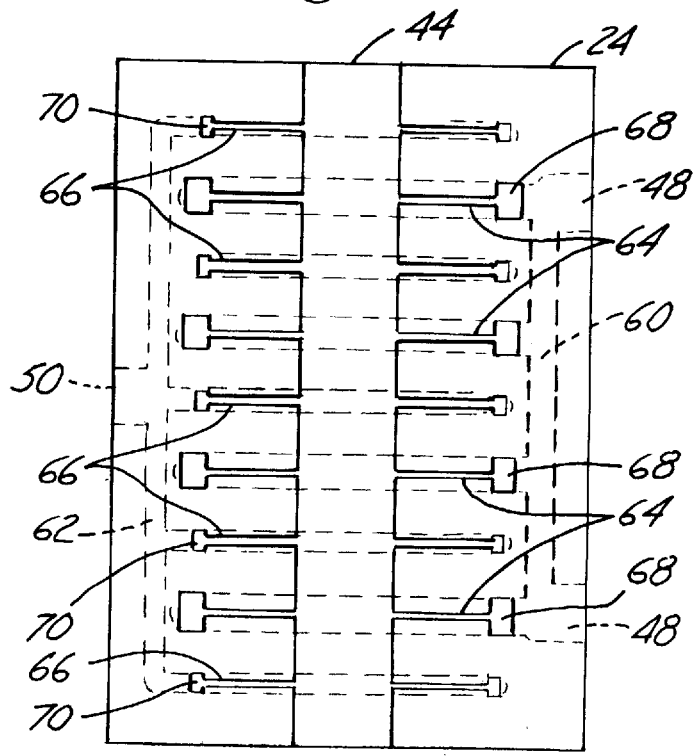
FIG. 10 is a plan view of the extrusion calibrator, showing the cover manifolds and channels, the sidewall channels, the inter-plate spacings and the extrusion passageway.

The route through the calibrator 20 for the circulation of vacuum and coolant will now be described with reference to FIGS. 3–10. FIG. 3 is a front perspective view of the set of extrusion calibrators 20 shown in FIG. 1, showing a threaded alignment rod 34 and inter-plate spacing washers 40 positioned in alignment above the cassette 32. FIG. 3 shows in the first plate 28 the threaded holes 36 through the cassette 32 and shows the cover 24 and threaded screws 54 removed from the cover holes 52 and from the holes 56, 58, respectively, in the edges of the cassette 32 and the edges of the sidewalls 26, with the vacuum 60 and coolant 62 manifolds and vacuum 64 and coolant 66 channels on the inside cover 24 surface. In the embodiment shown in FIGS. 3–10, the vacuum manifold 60 is shown as communicating between two vacuum access ports 48 and four vacuum channels 64 on each cover 24. The coolant manifold 62 is shown as communicating between one coolant access port 50 and five coolant channels 66 on each cover 24. The vacuum channels 64 are shown as wider than the coolant channels 66, and the vacuum 64 and coolant 66 channels are shown as alternately interfitting with each other. It will of course be understood that the number of access ports and channels and their relative size and arrangement to each other are a matter of engineering choice and may be varied to suit the needs of a particular application. The vacuum 64 and coolant 66 channels in the cover 24 are sized and arranged to communicate with corresponding vacuum 68 and coolant 70 channels in the sidewalls 26. The vacuum channels 68 are shown as wider than the coolant channels 70, and the vacuum 68 and coolant 70 channels are shown as alternating with each other. The alignment rods 34 and washers 40 position the inter-plate spacings 38 of the plates 28 in the cassette 32 to communicate between the vacuum channels 64, 68 and the coolant channels 66, 70, respectively, and the extrusion passageway 44. Note that in the embodiment shown in FIGS. 3–10, the three middle coolant interplate spacings 38a are shown as generally equal to the width of the coolant channels 66, 70, while the two end coolant interplate spacings 38b are narrower than the coolant channels 66, 70. The four vacuum interplate spacings 38c are shown as generally narrower than the three middle coolant interplate spacings 38a and generally about equal in width to the two end coolant interplate spacings 38b. Also, as can be seen with reference to FIGS. 3–10, the upper and lower covers 24 are identical. If a single calibrator 20 is used, the covers 24 will be completely identical and interchangeable with each other. The right and left sidewalls 26 are identical, reversible about a horizontal centerline and interchangeable with each other. Again, it will be understood that the sizing and arrangement of the interplate spacings 38 in the cassette 32 and of the channels 64, 66, 68, 70 in the covers 24 and sidewalls 26 are a matter of engineering choice and may be varied to meet the needs of a particular application. It should also be understood that, when the extrusion calibrator 20 is fully assembled, the mating faces of the sidewalls 26 to the edges of the plates 28 of the cassette 32 and the mating faces of the covers 24 to the edges of the sidewalls 26 and to the edges of the plates 28 of the cassette 32 are all fluid tight, so that fluid circulation through the extrusion calibrator 20 is conducted through the vacuum manifolds 60 and the vacuum channels 64, 68 to the extrusion passageway 44 and through the coolant manifolds 62 and the coolant channels 66, 70 to the extrusion passageway 44.

For ease of access, the first plate 28 of the extrusion calibrator 20 may have a beveled leading edge (not shown) at the aperture 30 leading to the passageway 44.

Figure 11:
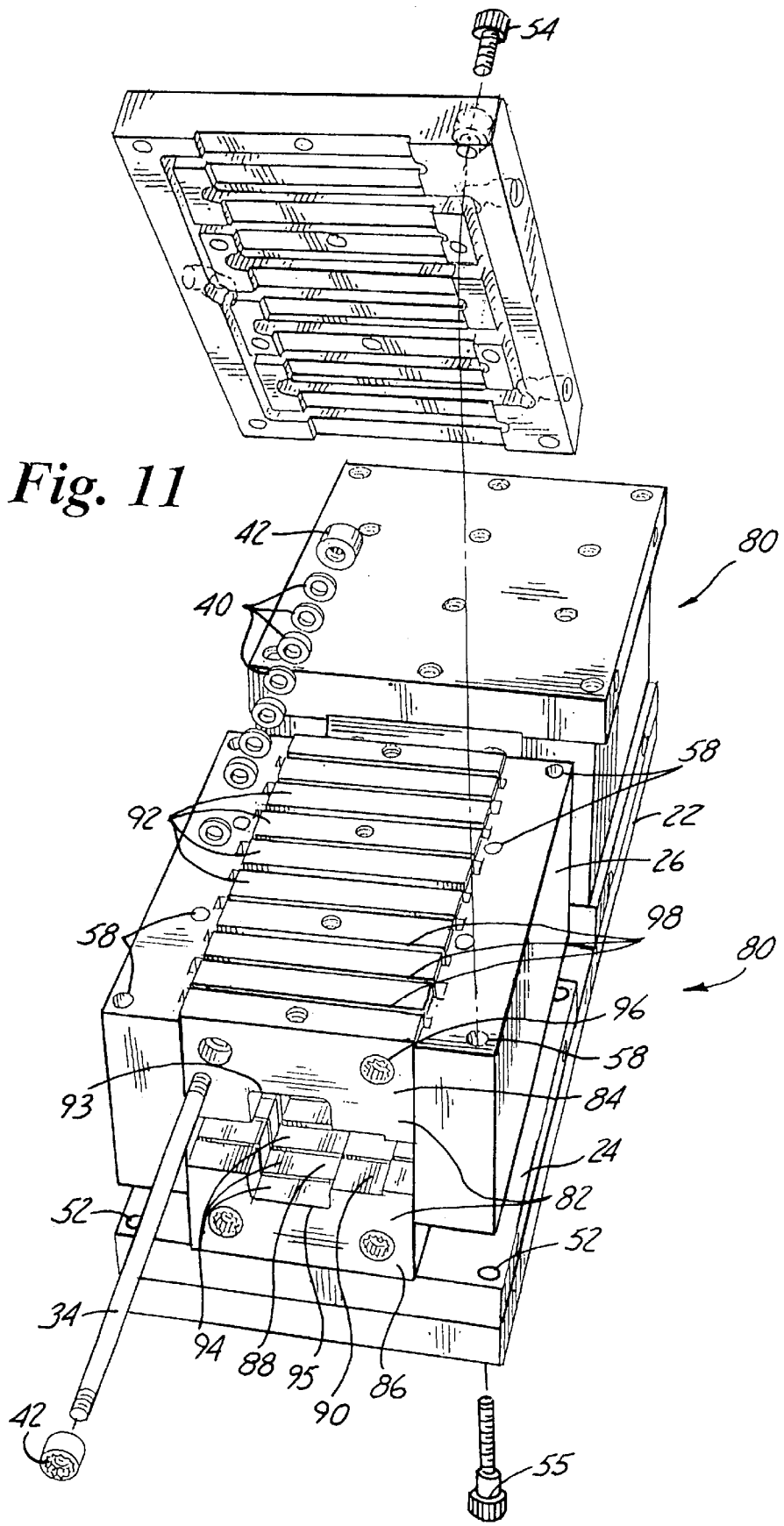
FIG. 11 is a perspective view of an alternate embodiment of an extrusion calibrator of this invention, showing a horizontally split cassette, in which the upper and lower cassette portions assemble to form a central passageway, for a hollow extruded product, with a side segment for a solid flange.

A second embodiment of an extrusion calibrator 80 according to this invention is shown with reference to FIG. 11. FIG. 11 is a perspective view of the extrusion calibrator 80, showing a horizontally split cassette 82, in which the upper 84 and lower 86 cassette portions assemble to form a central extrusion passageway 88, for a hollow extruded product (not shown), with a side segment 90 for a solid flange extending from the hollow extruded product. Each cassette portion 84, 86 is assembled from a set of upper and lower wear-resistant calibrating plates 92, 94. Each upper wear-resistant calibrating plate 92 has a portion of a cut-out 93 and each lower heat conducting calibrating plate 94 has a portion of a cut-out 95, such that the cut-outs 93, 95, with the edges of the plates 92, 94 mated together, form an extrusion aperture, sized and shaped to the exterior cross-sectional profile of the extruded product to be calibrated. Each set of upper and lower calibrating plates 92, 94 are separately oriented to each other and retained in an upper and lower cassette portions 84, 86, respectively, by precision ground rods 34 with threaded ends inserted into aligned holes 96. The required inter-plate spacings 98 between the upper and lower plates 92, 94 are sized and retained by spacing washers 40 aligned on the rods 34. The rods 34 retain each set of upper and lower plates 92, 94 and washers 40 in alignment by means of internally threaded ends 42, which may be counterbored into the outer faces of the first and last of the upper and lower plates 92, 94 of each upper and lower cassette portion 84, 86. The orientation and alignment of each set of upper and lower plates 92, 94 into each upper and lower cassette portion 84, 86 can be seen in FIG. 11. When individual upper and lower plates 92, 94 are assembled into the upper and lower cassette portions 84, 86, and when the upper and lower cassette portions 84, 86 are assembled into the horizontally split cassette 82, the cut-outs 93, 95 of the individual upper and lower plates 92, 94 form an extrusion passageway 88 through which the extruded product exiting from the extrusion die (both not shown) will travel. As already mentioned, the extrusion passageway 88 has a side segment 90. The larger area of the extrusion passageway 88 will form a generally hollow extruded product, while the side segment forms a generally solid flange or extension from the hollow extruded product. The suction action of the vacuum exhaust is great enough to pull the hollow extruded product against the walls of the passage way 88, but permits the extruded product to remain solid in the thinner, smaller-dimensioned side segment 90. Alternatively, if the cut-outs 93, 95 together define an extruded product which is entirely thinner and smaller-dimensioned, the entire extruded product may be solid throughout.

Once the horizontally split cassette 82 has been assembled by stacking the upper and lower cassette portions 84, 86 to each other, the upper and lower covers 24 are positioned to the cassette 82. Note that the covers 24 and sidewalls 26 for this alternate calibrator 80 of FIG. 11 may be the same as the covers 24 and sidewalls 26 for the calibrator 20 described with reference to FIGS. 1–10, as long as the number of plates 92, 94 in each cassette portion 84, 86 and the interplate spacings are the same as those of the calibrator 20 of FIGS. 1–10. If the number of plates 92, 94 and the interplate spacings are not the same as those of the calibrator 20 of FIGS. 1–10, the various access ports, manifolds, channels and other features and dimensions for the covers 24 and sidewalls 26 for the alternate calibrator 80 will vary accordingly. With the appropriate covers 24 positioned to the assembled horizontally-split cassette 82, the right and left sidewalls 26 are slid into place. The covers 24 are retained to the cassette 82 by clearance holes 52 through each cover 24 and threaded holes in corresponding edges of each set of plates 92, 94. The covers 24 are retained to the sidewalls 26 by clearance holes 52 through each cover 24 and threaded holes 58 in each sidewall 26. The clearance holes 52 may be counterbored. As described for the extrusion calibrator 20 illustrated in FIGS. 1–10, the extrusion calibrator 80 illustrated in FIG. 11 may be used in pairs in series and may be attached to a single baseplate 22. To secure the baseplate 22 to the lower cover 24, a few threaded screws 54 are removed from holes 52 in the lower cover 24, and threaded shoulder bolts 55 are inserted through the corresponding holes in the baseplate 22 and lower cover 24 and are screwed into threaded holes in edges of the plates 28 and/or sidewalls 26. This is the same method of attachment of the baseplate to the embodiment shown and described above with reference to FIG. 3. The shoulder bolts 55 may be counterbored in the baseplate 22 holes.

Typically, the plates, covers, sidewalls and the connecting rods, washers and threaded connectors, screws and shoulder bolts may be constructed of a sufficiently hard metal, including such metals as steel, such as stainless steel, brass, bronze, aluminum, etc. All of the features on the plates, covers and sidewalls, including the access ports, manifolds, channels, apertures, cut-outs and threaded holes may be shaped by machining. This eliminates the need for costly, time-consuming and technically difficult procedures, such as EDM, which had been required for earlier extrusion calibrators, in which the extrusion passageway and the vacuum and coolant routes were constructed from a solid metal block, or in which vacuum and coolant routes were constructed in thinner metal plates interleaved between the wear-resistant plates.

According to the features of the extrusion calibrator of the present invention, when it is necessary to provide an extrusion passageway of different size and shape to accommodate calibration of a different extruded product exiting from an extrusion die, removal of the upper cover (and optionally the sidewalls or sidewall portions) allows interchange of a cassette of one passageway for a cassette of the newly desired passageway. The vacuum and coolant connections external to the calibrator remain in place on both of the covers during the change over.

It will, of course, be apparent to those of skill in this art that various modifications and equivalents can be made in accordance with the teachings of this invention without departing from the scope of the invention. There is no intention to limit the scope of this invention, other than as required in accordance with the following claims.

That which is claimed is:

1. An extrusion calibrator to calibrate an exterior profile of a thermoplastic extruded product exiting from an extrusion die, comprising:
   a pair of covers, each cover having a vacuum manifold and a coolant manifold formed on a surface thereof, the manifolds having a vacuum channel and a coolant channel, respectively, providing communication between the vacuum manifold and a vacuum source, and between the coolant manifold and a coolant source;
   a pair of sidewalls, each side wall having a vacuum channel and a coolant channel, respectively, in communication with the vacuum manifold and the coolant manifold, respectively; and
   calibrating plates, each plate having a calibrating aperture dimensioned to an extruded product cross-section exterior, the plates oriented to each other, so that the apertures together define an extrusion passageway through the calibrator, the plates spaced to each other and to the respective manifold channel, so that a first inter-plate spacing communicates solely between the vacuum manifold, vacuum channels and the passageway, while a second inter-plate spacing communicates solely between the coolant manifold, coolant channels and the passageway, the covers and sidewalls assembled to the plates, so that the covers and sidewalls together form an open-ended shell with open ends oriented longitudinally with the passageway.

2. A calibrator according to claim 1, wherein the calibrator is constructed of steel.

3. A calibrator according to claim 1, wherein the channeled cover surfaces are constructed with a recess matched to the plates oriented to each other, to further locate and retain the covers to the oriented plates.

4. A calibrator according to claim 1, wherein the apertures decrease in direction of travel of the extruded product through the calibrator, to accommodate shrinkage of the extruded product with cooling.

5. An extrusion calibrator according to claim 1, wherein the vacuum and coolant channels are in alternating parallel arrangement to each other, respectively.

6. An extrusion calibrator according to claim 1, wherein the vacuum manifold and channels are of larger cross-section than the coolant manifold and channels.

7. An extrusion calibrator according to claim 1, wherein the cover has holes to retain the cover to corresponding threaded holes in ends of the side-walls and the plates.

8. An extrusion calibrator according to claim 1, wherein the threaded holes in the side wall ends are symmetrical.

9. An extrusion calibrator according to claim 1, wherein the cassette comprises mating upper and lower cassette portions, each formed of upper and lower plate portions, wherein the upper and lower plate portions, respectively, are retained and spaced into the upper and lower cassette portions, respectively, by threaded pins through holes in the upper and lower plate and cassette portions.

10. An extrusion calibrator according to claim 1, wherein the covers are identical.

11. An extrusion calibrator according to claim 1, wherein the sidewalls are identical.

12. A calibrator according to claim 1, wherein the plates are retained together into a cassette by threaded pins inserted through the cassette, the pins generally aligned with the passageway, and with the inter-plate spacing maintained by spacers on the pins.

13. An extrusion calibrator according to claim 12, wherein the threaded pins are counter-sunk.

14. An extrusion calibrator according to claim 1, wherein the first and last inter-plate spacings of the cassette communicate with the coolant manifold and channels and the other inter-plate spacings alternately communicate with the vacuum manifold and channels and the coolant manifold and channels, respectively.

15. An extrusion calibrator according to claim 14, wherein the first and last coolant inter-plate spacings are smaller than the other coolant inter-plate spacings, and wherein the vacuum inter-plate spacings are generally equal to the first and last coolant inter-plate spacings.

16. An extrusion calibrator according to claim 14, wherein the vacuum source and outlet are on the covers and on the same side of calibrator, along the passageway length, and wherein the coolant source and outlet are on the covers and on a calibrator side opposite that of the vacuum source and outlet, along the passageway length.

17. A modular extrusion calibrator according to claim 1, wherein two calibrators are attached to a base plate, so that their passageways are generally axially aligned to each other.

18. A modular extrusion calibrator according to claim 17, wherein the base plate is retained to the calibrator cover by counter-sunk threaded screws.

* * * * *